United States Patent Office

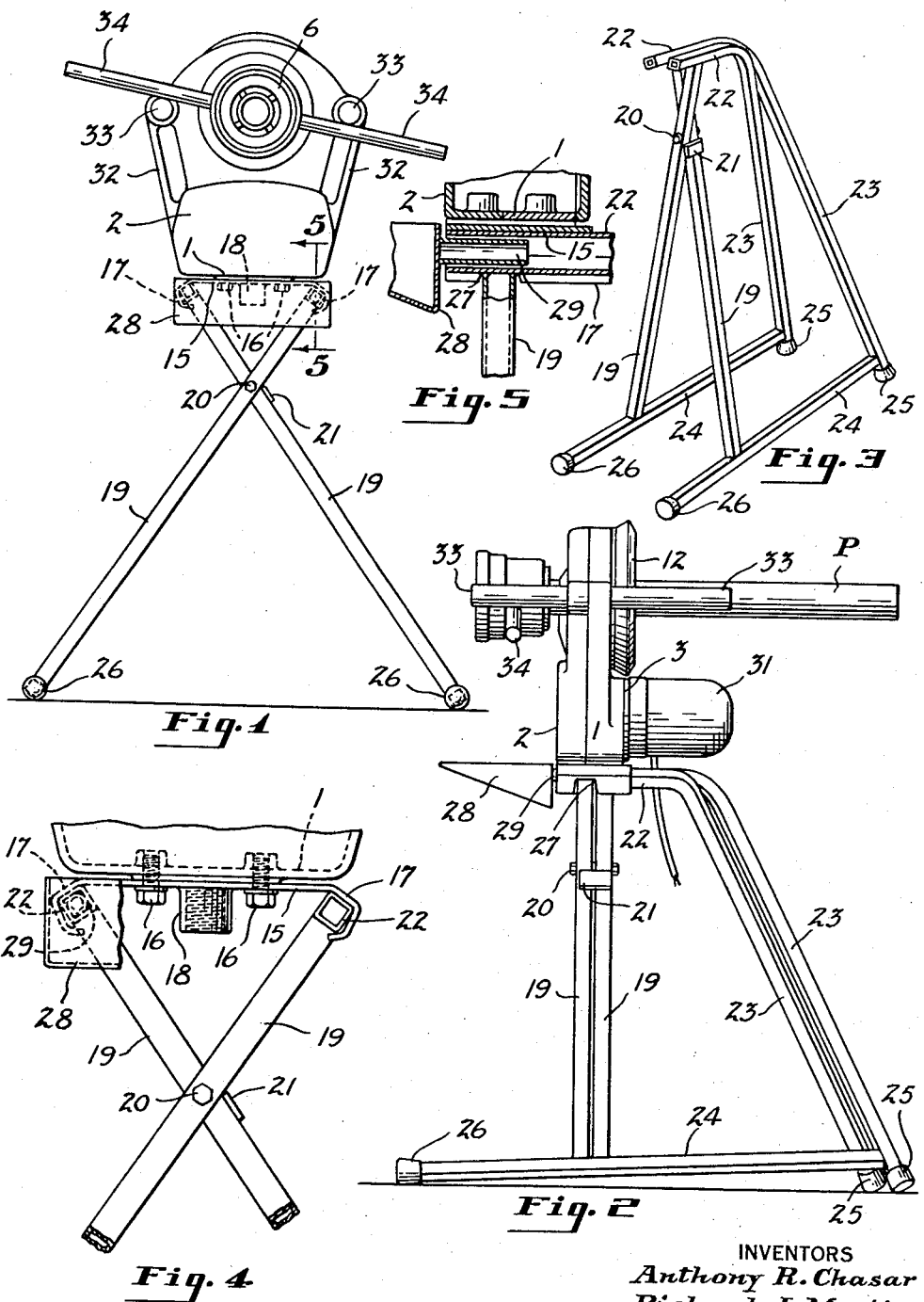

2,919,092
Patented Dec. 29, 1959

2,919,092

COLLAPSIBLE STAND FOR POWER UNITS

Anthony R. Chasar, Cleveland, and Richard J. Martin, South Euclid, Ohio, assignors to The Oster Manufacturing Company, Wickliffe, Ohio, a corporation of Ohio Original application March 18, 1955, Serial No. 495,124. Divided and this application February 14, 1956, Serial No. 565,415

3 Claims. (Cl. 248—164)

This invention is a division of our copending application Serial No. 495,124, filed March 18, 1955 (Patent No. 2,887,886) and relates to portable power units and more particularly to a power driven manually controlled chuck adapted to grip and rotate a workpiece, shaft or tool, and to accessories by means of which the unit can be quickly and easily set up for any one of several operations and can be quickly and easily moved from place to place.

The power unit of the present invention comprises a housing for a power driven chuck having closely spaced front and rear walls that are provided with alined openings in the upper portions thereof in which a tubular chuck body or spindle is rotatably mounted. The chuck is adapted to clamp a pipe or other workpiece within the tubular chuck body and may be provided with a conventional hand wheel operated work clamping means.

To facilitate the employment of the power unit as a work holding and rotating device in connection with means for performing turning, cutting, reaming or threading operations, a collapsible supporting frame is provided. The housing and collapsible frame have inter-engaging parts for securing the housing and frame in a fixed position in such manner that the power unit is rigidly supported for the desired machining operations to be performed and so that the power unit can be readily detached from the frame by lifting it off the supporting frame.

Reference should be had to the accompanying drawings forming a part of this specification, in which:

Figure 1 is a front elevation of the power unit and its collapsible supporting stand;

Fig. 2 is a side elevation of the power unit and stand;

Fig. 3 is a perspective view of the supporting stand;

Fig. 4 is a fragmentary front elevation on an enlarged scale showing the connection between the collapsible frame and the chuck housing; and Fig. 5 is a fragmentary sectional view on an enlarged scale taken on the line indicated at 5—5 in Fig. 1.

Referring to the accompanying drawings, the power driven chuck is mounted in a housing having an elongated flat base 1 and closely spaced upright front and rear walls 2 and 3. The walls 2 and 3 have inturned marginal flanges that abut to form the opposite side walls and the top wall of the housing. In the upper portion of the housing, the front and rear walls 2 and 3 have alined openings and a tubular chuck body 6 is journaled in the housing openings. As shown in Fig. 2, a pipe P may be received in the tubular chuck body and be clamped thereto by conventional clamping means operated by a hand wheel 12.

An elongated rectangular attaching plate 15, which conforms substantially to the bottom wall 1 of the chuck housing, is secured to the bottom wall by means of bolts 16 and is provided with outturned end flanges 17 and with a central socket 18 that is adapted to receive the upper end of a supporting leg. A collapsible supporting frame is provided for the power unit and this frame is provided with a pair of crossed supporting legs 19 that are connected intermediate their ends by a horizontal pivot 20. A stop lug 21 is attached to one of the legs 19 to limit the spreading movement of the upper and lower ends of the legs. A supporting bar 22 is attached to the upper end of each of the legs 19 and is disposed at right angles to the leg. The supporting bars have downturned inclined leg portions 23 that are integral therewith and that are disposed substantially in the planes of the legs 19. Base bars 24 are attached at their rear ends to the inclined leg portions 23 of the supporting bars and to the lower ends of the crossed supporting legs 19, the bars 24 being attached to the inclined legs 23 above the lower ends thereof and projecting past the supporting legs 19. The lower ends of the inclined legs 23 and the forward ends of the bars 24 may be provided with rubber floor engaging tips 25 and 26.

When the power unit is mounted on the supporting stand as shown in Figs. 1 and 4, the bottom plate 15 rests on the horizontal supporting bars 22 and the weight of the unit spreads the upper ends of the supporting legs 19 to hold the supporting bars 22 in engagement with the end flanges 17 of the supporting plate. The flanges 17 have inturned lower edges and are provided with notches 27 that are positioned to receive the upper ends of the legs 19 when the chuck housing is supported with its front wall 2 substantially flush with the forward ends of the supporting bars 22, the notches 27 serving to properly position the housing on the supporting stand.

The lug 21 is positioned to permit the bars 22 to move apart a distance slightly greater than the distance between the flanges 17 so that the bars 22 are pressed against the flanges 17 by the weight of the power unit. Before placing the power unit on the stand the legs 19 may be rocked about the pivot 20 to position the bars 22 at a distance apart less than the distance between the inturned lower edge of the flanges 17 and the frame will be held in this position by the frictional engagement of the rubber tips 25 and 26 with the floor. When the power unit is lowered onto the bars 22 to engage the plate 15 therewith, the weight of the power unit will spread the bars into engagement with the flanges 17 to lock the power unit to the supporting frame.

The supporting legs 19, the supporting arms 22 and the base bars 24 are preferably formed of tubing in order to provide a light weight supporting stand and the open ends of the tubular supporting bars 22 may provide support for a chip pan 28 which is provided with spaced rigid supporting arms 29 that are telescopically received in the supporting arms 22.

The chuck is preferably driven by a reversible electric motor 31 attached to the bottom portion of the rear wall of the chuck housing. The chuck housing is provided with handgrips 32 on opposite sides thereof to facilitate the placing of the housing on the supporting stand and removal of the housing therefrom. The housing also has horizontally disposed rods 33 slidably mounted therein on opposite sides of the chuck in horizontal alinement with the chuck axis, and these bars serve as tool rests or for holding a cutting tool against turning movement with the spindle or chuck body.

In Figs. 1 and 2, a diestock having oppositely extending handles 33 engaging the handles 34 of the diestock prevent the diestock from turning with the pipe P so that a threading operation can be performed by driving the chuck.

It is to be understood that in accordance with the provisions of the patent statutes, variations and modifications of the specific devices herein shown and described may be made without departing from the spirit of the invention.

What we claim is:

1. A portable power unit comprising a housing having a bottom plate provided with parallel downturned end flanges, and a collapsible supporting stand for said unit comprising a pair of supporting bars having parallel horizontal portions that engage the under side of said plate and floor engaging leg portions that extend downwardly at a rearward inclination from the rear ends of said horizontal portions, a pair of parallel base bars, one attached to the leg portion of each supporting bar above its floor engaging end, extending forwardly therefrom and having a floor engaging forward end, a front supporting leg connecting the horizontal portion of each supporting bar to the base bar that is attached to said supporting bar, each front supporting leg being attached at its upper end to the horizontal portion of the supporting bar and at its lower end to the base bar rearwardly of the forward end thereof, the leg portions of said supporting bars and the front supporting legs being disposed in crossing relation, and means pivotally connecting said front supporting legs at their crossing point to swing about a horizontal axis, said supporting bars being movable with said supporting legs about said horizontal axis and being held by the weight of said unit against said end flanges.

2. A portable power unit such as set forth in claim 1 in which the downturned flanges of the bottom plate are notched to provide inturned edge portions that straddle said front supporting legs to position the unit on the supporting stand.

3. A portable power unit such as set forth in claim 1 in which the horizontal portion of the supporting bars are tubular and open at their forward ends and in which a chip tray having spaced rigid supporting arms telescopically received in said tubular supporting bars is supported forwardly of said base plate.

References Cited in the file of this patent

UNITED STATES PATENTS

| | | |
|---|---|---|
| 934,139 | Castracane | Sept. 14, 1909 |
| 1,394,526 | Amsden | Oct. 25, 1921 |
| 1,510,084 | Brainerd | Sept. 30, 1924 |
| 1,983,292 | Hoe | Dec. 4, 1934 |
| 2,191,191 | Pealer | Feb. 20, 1940 |
| 2,304,027 | Sellmeyer | Dec. 1, 1942 |
| 2,441,727 | Snow | May 18, 1948 |
| 2,567,128 | Shoffner | Sept. 4, 1951 |
| 2,666,681 | Adler | Jan. 19, 1954 |
| 2,678,453 | Rudolph | May 18, 1954 |
| 2,692,807 | Cordola | Oct. 26, 1954 |
| 2,757,998 | Adler | Aug. 7, 1956 |